United States Patent [19]

Hess et al.

[11] 4,009,100
[45] Feb. 22, 1977

[54] METHOD OF TREATING WASTE WATER WITH JET NOZZLES

[75] Inventors: Klaus Hess; Richard Stickel, both of Bad Duerkheim; Otto Nagel, Neustadt; Richard Sinn, Ziegelhausen; Hans Daucher, Ludwigshafen, all of Germany

[73] Assignee: BASF Aktiengesellschaft, Ludwigshafen (Rhine), Germany

[22] Filed: Jan. 27, 1975

[21] Appl. No.: 544,307

[30] Foreign Application Priority Data

Jan. 30, 1974 Germany .................... 2404289

[52] U.S. Cl. .................... 210/14; 210/15; 210/170
[51] Int. Cl.² .................... C02C 1/08
[58] Field of Search ............ 210/14, 15, 170, 220, 210/18; 261/77

[56] References Cited
UNITED STATES PATENTS

| 3,733,263 | 5/1973 | Mandt | 210/14 |
| 3,755,452 | 8/1973 | Sinn et al. | 261/77 |
| 3,840,457 | 10/1974 | Wilson | 210/14 |
| 3,846,291 | 11/1974 | Brucker | 210/14 |
| 3,846,292 | 11/1974 | Le Compte | 210/14 |
| 3,893,924 | 7/1975 | Le Compte et al. | 210/14 |

FOREIGN PATENTS OR APPLICATIONS

1,377,571  9/1964  France .................... 210/14

Primary Examiner—Thomas G. Wyse
Attorney, Agent, or Firm—Johnston, Keil, Thompson & Shurtleff

[57] ABSTRACT

Method of biologically treating waste water with gasifying nozzles producing a screw-type flow in the activated sludge system. The method provides a maximum partial pressure gradient for the transfer of oxygen to the mixture of waste water and activated sludge.

11 Claims, 5 Drawing Figures

METHOD OF TREATING WASTE WATER WITH JET NOZZLES

This application discloses and claims subject matter described in German Patent Application P 24 04 289.5, filed Jan. 30, 1974, which is incorporated herein by reference.

The present invention relates to a method of treating waste water in activated sludge systems using one or more gasifying nozzles, preferably gas/liquid nozzles or jet nozzles.

In such methods, biologically degradable waste matter is removed from the waste water by microorganisms (activated sludge). The waste matter is partially converted to carbon dioxide and partially to settleable solids. To this end, the waste water is mixed with activated sludge in specific proportions. In order to maintain the metabolism in the microorganisms in aerobic environment, i.e. in the presence of dissolved oxygen, oxygen must be added mechanically. The mixture of waste water and activated sludge must be agitated to avoid a settling of the sludge, since such a sludge sediment participates only partially in the aerobic metabolism and decay thereof may even cause operational breakdowns. Since the microorganisms may react to fluctuation in the concentration and composition of the waste water with reduced activity, the raw waste water must be added in such a manner that it is distributed over the entire volume of waste water/activated sludge mixture as quickly as possible. Any foam produced on aerating the mixture of waste water and activated sludge must be treated in such a manner that the activated sludge suspended therein is returned to the mixture. Such floating activated sludge thickens at the surface and may cause operational breakdowns if decay thereof occurs. The foam itself must be restricted to a maximum level. The waste water/activated sludge mixture flows from the reservoir to a settling tank, where it separates into clarified effluent and activated sludge. The activated sludge is returned to the reservoir, excess sludge being removed from the process.

Known methods of satisfying these requirements involve the use of tanks (reservoirs, basins, etc.) or ditches (canals, etc.) as follows: In ditches the mixture of waste water and activated sludge flows at a specific average rate. In reactor terms, ditches are loop reactors.

Oxygenation occurs either at the surface of the mixture of waste water and activated sludge using so-called surface aerators (brushes, disks or gyroscopic means) which agitate the surface with their partially immersed rotating means to increase the interfacial area, or is effected below the surface of the mixture by means of ejector nozzles which increase the interfacial area by atomizing injected oxygen-containing gas by means of a water jet.

Turbulence is caused by the agitation effected by the surface aerators and by the use of baffles. The momentum imparted to the mixture of waste water and activated sludge by the surface aerators contains a vertical component. These two effects, i.e. the vertical momentum and the turbulence, are intended to prevent sedimentation of the sludge.

The ejector nozzles are arranged so as to point in the direction of flow of the mixture of waste water and activated sludge with the result that the momentum of the ejected mixture causes a circulatory flow in the ditch. The nozzles are evenly distributed over the width of the ditch and are disposed parallel to each other near the bottom, frequently just upstream of a bend in the ditch. A screw-type flow is induced in the bend and this ensures that elements of volume which are rich in oxygen near the column of bubbles rising in the region of said screw-type flow are often replaced by low-oxygen waste water/activated sludge mixture. Thus more oxygen is absorbed from the gas, than when aeration is effected in a straight portion of the ditch where no rotation is superimposed on the translational movement of the ditch contents.

The mixture of waste water and activated sludge is circulated in a closed ditch forming an annular, oval or meandering loop reactor. The mixture of waste water and activated sludge flows past the inlet or inlets for the waste water and recycled sludge at a specific velocity. This effects dilution of the raw sewage in the same ratio as that of the feed rate to the rate of circulation.

The surface aerators preferably agitate the surface of the mixture and draw it into the region of influence of the rotating machine parts. This causes suspended sludge to re-enter the mixture. The height of the layer of foam is restricted, if necessary, by sprinkling with water and/or by adding antifoaming chemicals. When surfactants are present, the use of injector aeration causes a foam having very fine bubbles containing suspended activated sludge. This foam must be specially treated.

Tanks are systems in which the mixture of waste water and activated sludge shows no directional flow characteristics. Technically, tanks are stirred vessels.

Oxygenation is effected either by the use of surface aerators as in the case of ditches or by bubbling in compressed air. This increases the interface between the injected gas and the mixture of waste water and activated sludge. Oxygen-containing gas is supplied through perforated tubes or through fritted glass disks disposed near the bottom of the tank or beneath immersed stirrers which mechanically break up the bubbles into smaller bubbles or by means of ejectors in which jets of liquid introduce additional energy for distributing the gas. Usually, groups containing a plurality of such ejectors arranged symmetrically about a vertical axis are used, the gas issuing therefrom being directed horizontally or downwardly at an angle to the horizontal.

In some prior art processes not air but oxygen or high-oxygen gas is passed into the mixture of waste water and activated sludge.

The activated sludge does not settle when the flocs are subjected to flow pulses counteracting sedimentation in the following manner:

When surface aerators are used, upward vertical currents are induced beneath them, which currents suck in the mixture of waste water and activated sludge from their environment. The mixture which is thrown up descends onto the surface at a distance from the aerating means and then flows in all directions from the point of descent. When surface aerators having a vertical axis are used, the mixture is caused to rotate, and the momentum can be utilized for agitating the mixture when the surface aerator is positioned appropriately.

In the case of aeration by compressed air a column of rising bubbles is formed in which the mixture of waste water and activated sludge is also caused to ascend on account of impulse exchange. The tanks are shaped so as to cause the descending sludge to return to the column of bubbles. This may also be achieved by horizontally shifting the column of bubbles.

When air is introduced through ejectors a directed jet of air emerges from the nozzle and this jet, which is directed toward the bottom of the tank, stirs up the settled sludge. This jet also sucks in waste water and activated sludge from its environment and increases the conveying action of the ascending bubbles.

To obviate intoxication, the raw untreated waste water is fed to the basin at several points simultaneously so that rapid dilution thereof with the existing mixture occurs.

Where ejectors are used, the ejector nozzles may effect the rapid distribution of the raw waste water if desired.

Where surface aerators are used, the foam in their zone of influence is counteracted by the spray of waste water/activated sludge mixture thrown up by the aerators. Where aeration is effected with compressed air, the surface is sprinkled from nozzles provided for that purpose.

In the prior art processes, the following disadvantages occur in attempts to fullfil these requirements:

Methods of increasing the surface area of the liquid (surface aeration) by throwing up the mixture of waste water and activated sludge involve the formation of aerosols which, when certain malodorous substances are present, may constitute an environmental nuisance and which, when the waste water contains pathogenic germs, may constitute a serious environmental danger.

Since the oxygen is introduced only at the surface, the depth of the tank is restricted. This makes it necessary to provide large areas for reasons of reaction kinetics.

The mechanical drive of the rotating means and the wave of liquid thrown up and back into the tank are the cause of considerable noise which is difficult to suppress.

Since, particularly in the case of surface aerators having a vertical axis, the process of sucking in and throwing up the liquid imparts only a random flow impulse to the surrounding mixture, thorough mixing is only guaranteed in a diffuse region surrounding the aerator.

It is not possible to convert the system to one in which aeration is carried out with oxygen or with gases having a high oxygen content, without placing a cover over the facility.

The formation of waves on the surface can lead to considerable alternating stresses of the driving means which make it necessary to use an overlarge drive.

It is necessary to provide foundations for the surface aerators at each aerating point.

Where the mixture of waste water and activated sludge is sucked in and thrown up in ditches, particularly where vertical-axis surface aerators are used, only a small portion of the flow impulse is imparted in the direction of rotary flow and this means that considerable flow losses occur.

Aeration using ejectors leads to marked foam formation when surfactants are present. Where aeration is effected evenly over the width of the basin, a high heap of bubbles is formed on the surface of the mixture extending from one edge of the tank to the other. The liquid flowing from the heap of bubbles forms an impenetrable barrier for the oncoming foam. The suspended activated sludge tends to accumulate at this point and thus to decay.

To increase the turbulence in the column of bubbles induced by the ejectors, the rotation induced in bends is utilized and this means that the ditches must be shaped so as to have bends at as many aerating points as possible. However, since the resistance to flow in bends is at least one order of magnitude greater than in straight canals, an uneconomically high impulse is required to maintain an adequate rate of circulation.

Expensive platforms must be provided over tanks for machine maintenance and also, if necessary, for replacement of the drives.

The restricted area of influence of the aerators may necessitate the use of expensive tank shapes, e.g. to subdivide the tank into cells of square plan, each provided with a surface aerator in the center.

In the case of compressed-air aeration through fritted glass disks and perforated tubes, the column of ascending bubbles produces a flow in the vertical direction only. There is no flow component in the horizontal direction to effect rapid mixing of the entire contents of the tank, and this horizontal component must be produced by additional measures.

The velocity and thus the flow impulse of the rising gas bubbles is at a minimum at the bottom of the tank. However, it is necessary to maintain the activated sludge in suspension, particularly at the bottom, and this method thus involves a very great risk of sludge deposition.

The orifices for the emerging air are smaller than or equal to the diameter of an air bubble in equilibrium as governed by the pressure and the surface tension. These small orifices having diameters of not more than a few millimeters very easily become chocked up with sludge sediment.

When air is simply bubbled into the mixture, the interface for oxygen transfer is restricted by the size of the bubbles in equilibrium.

Foam treatment must be effected over the entire surface of the tank due to the fact that there is no rotary flow. Although the superficial liquid flowing from the heap of bubbles conveys the foam to the edge of the basin, it is still essential to treat the foam over the entire length of the edge of the tank. The drawback of this treatment is that the liquid used for sprinkling onto the foam involves further costs and such sprinkling produces aerosols which produce unpleasant odors and may, if the waste water contains pathogenic germs, constitute a serious danger to the environment.

Where the tanks are aerated by ejectors according to prior art processes, the surface of the mixture of waste water and activated sludge shows random motion. For this reason, the foam produced during aeration covers the entire surface and must be treated over a large area by sprinkling. The resulting aerosols contain malodorous substances and, possibly, pathogenic germs, which are environmentally undesirable or even dangerous. A further drawback is the amount of liquid required for sprinkling, this being proportional to the area to be sprinkled.

It is an object of the invention to obviate the above drawbacks in the biological treatment of waste water and to effect jet aeration of an activated sludge system showing directional flow in such a manner that the forward impulse of the jet aeration is superimposed on the up-draught of the gas so as to produce a screw-type flow.

In accordance with the present invention, this object is achieved by producing a directed flow in the tank by impulse exchange between the mass flow leaving the nozzle or nozzles at an average impulse density of from $10^3$ to $10^4$ $N/m^2$ and preferably from 3,000 to 5,000 $N/m^2$ and the slower mixture of waste water and activated sludge from the environment of the nozzle or nozzles flowing at an average impulse density of from 50 to $10^3$ $N/m^2$ and preferably from 90 to 500 $N/m^2$, on which directional flow a rotary motion is superimposed by the column of ascending bubbles emerging from the nozzle or nozzles asymmetrically to the point of gravity of the plane of cross-section perpendicular to the walls of the tank and near the bottom of the body of waste water and activated sludge.

In order to agitate the surface of the mixture of waste water and activated sludge or to prevent sedimentation of the activated sludge, an advantageous embodiment consists in that the direction of the mass flow emerging from the nozzle or nozzles in the horizontal plane of projection is not more than ±90° to the lines parallel to the lateral walls of the tank or to the tangent of the curved walls of the tank and is inclined upwardly or downwardly by not more than 90° and contains a velocity component in the direction of the slower moving mixture of waste water and activated sludge in the vicinity of the nozzle or nozzles.

Since the volume of the tank is determined by the throughput and the residence time of the mixture of waste water and activated sludge, an adequate tank depth for economic jet aeration is achieved if, according to a further embodiment of the invention, the mixture is recycled.

To improve the biochemical activity of the activated sludge and reduce its tendency to settle, it may be advantageous to increase the concentration of oxygen in the activated sludge above that obtainable by saturation with air. Thus, according to a further embodiment of the invention, the gas fed to the nozzles is not air but oxygen or a high-oxygen gas.

To effect rapid distribution of toxic substances contained in the waste water and/or to reduce costs, it is advantageous to use, as propellant liquid for the nozzles, raw waste water and/or clarified water and/or activated sludge and/or recycled sludge.

In the case of long residence times but low oxygen consumption by the mixture it is advantageous, according to another embodiment of the invention, to prevent sedimentation by moving the nozzles through the mixture of sewage and activated sludge.

To facilitate rapid replacement of the mixture of waste water and activated sludge surrounding the nozzles, the mass stream emerging from the nozzles advantageously has a velocity component which is counter to the direction of movement of the nozzles.

Since foam may be produced by the jet aeration, it is advantageous to sprinkle all or part of the surface of the mixture of waste water and activated sludge with a liquid.

To facilitate rapid distribution of auxiliaries, it is advantageous to add to the said liquid antifoaming chemicals and/or antisettling agents and/or flocculating agents and/or adsorbents.

The advantages achieved by the present invention are as follows:

1. A maximum partial pressure gradient is available for the transfer of oxygen to the mixture of waste water and activated sludge, because the directional flow causes waste water and activated sludge mixture containing a minimum amount of oxygen to be moved toward the nozzles.

2. The activated sludge is maintained in suspension even when the distance between the nozzles is great, since the mixture of waste water and activated sludge is helically rotated about a horizontal axis.

3. The large distances between the nozzles make it possible to use high rates of flow of gas and propellant liquid and thus to employ large orifices which cannot become choked up.

4. It is possible to use deep tanks of small base area, since the gas can be fed to the mixture at the bottom.

5. Since the buoyant force of the gas is used for effecting rotation of the flow, sedimentation of the activated sludge and all its undesirable side effects are avoided without it being necessary to increase the turbulence of the flow by the use of additional energy.

6. Foam can be treated at a few points of the tank over small areas which are easily covered, because the foam is moved by the surface of the mixture moving in a specific direction.

7. The jet aeration causes only a minimum of undesirable odor, because the high degree of absorption achieved in such aeration means that only a minimum of gas need be contacted by the mixture of waste water and activated sludge.

8. On account of the high degree of absorption of the gas, aeration may be carried out with pure oxygen or high-oxygen gases without it being necessary to cover the tank.

9. The use of jet aeration produces no aerosols.

Some of the more important embodiments of the invention are illustrated in the accompanying FIGS. 1 to 5 and described below with reference thereto.

EXAMPLE 1

Figure 1:
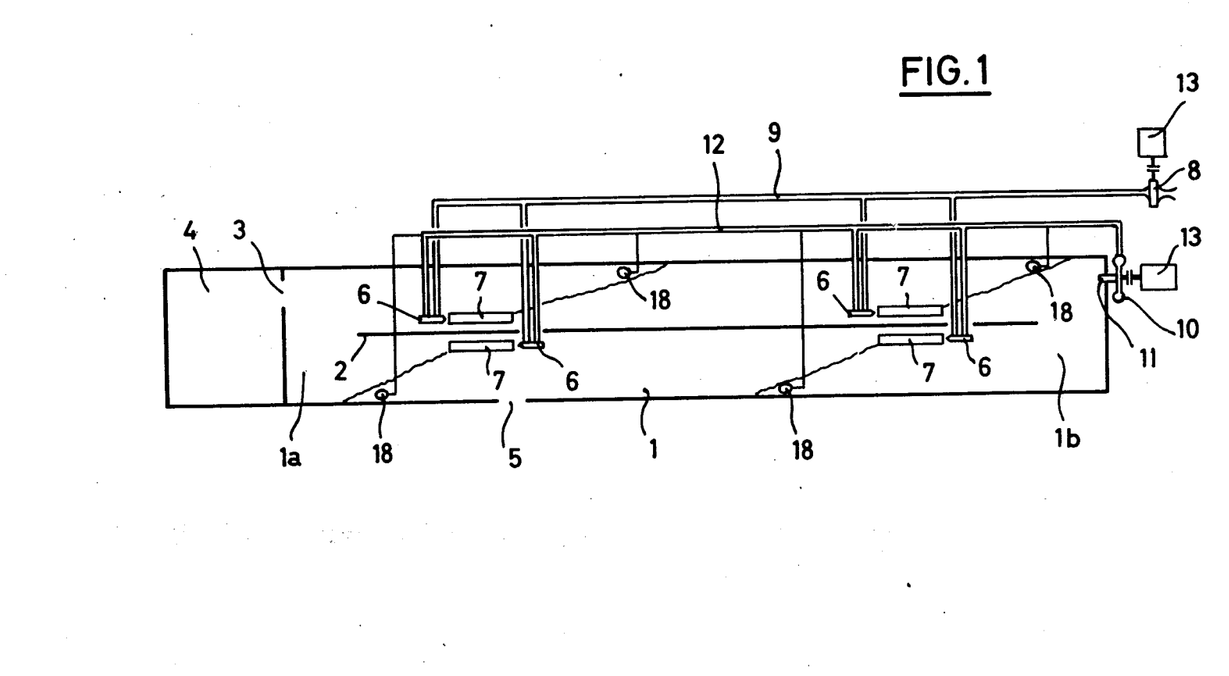
FIG. 1 is a plan-view of an oxidation ditch equipped with jet aerating facilities.
Figure 2:
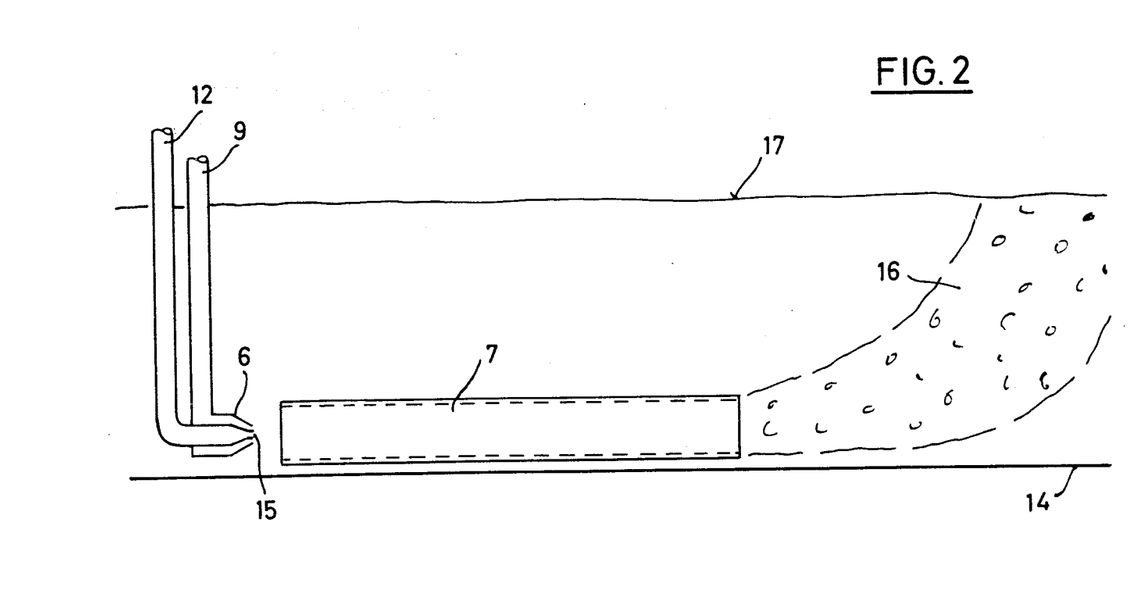
FIG. 2 is a longitudinal section and FIG. 3 is a cross-section of the said ditch on a larger scale.
Figure 3:
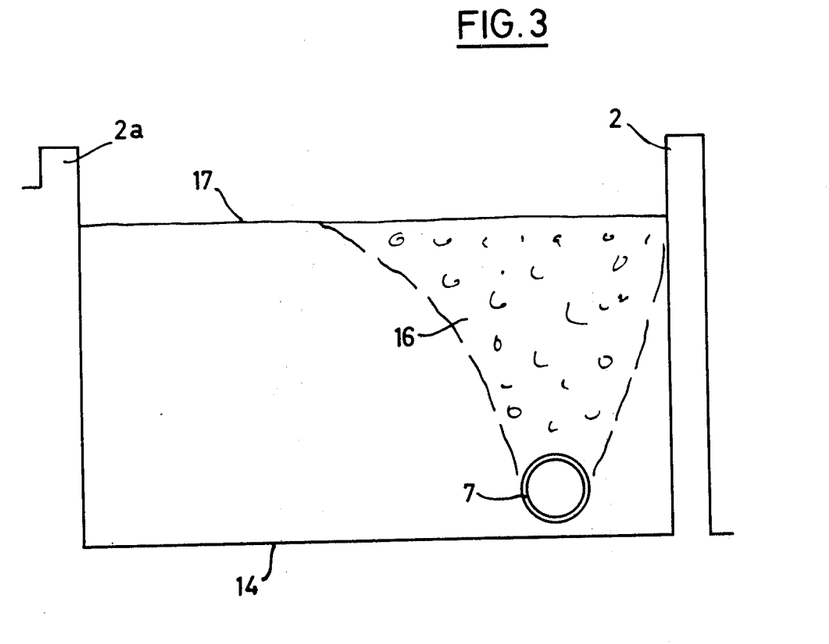

Ditch 1 is 37 m long, 6 m wide and 2 m deep. A partition 2 divides it into two parallel sections which are interconnected by two bends 1a and 1b to form a loop reactor. The mixture of waste water and activated sludge passes into the ditch through an inlet 3 from a reactor 4 and leaves the ditch through an outlet 5. The reactor 4 is required for anaerobic denitrification. The ejectors consisting of gas/liquid nozzles 6 and impulse exchange tubes 7 are disposed at four points at the bottom 14 of the ditch. A compressor 8 supplies compressed air through a pipeline 9 to the nozzles 6. A centrifugal pump 10 sucks the mixture of waste water and activated sludge from the ditch through a pipe 11 and conveys it through a pipeline 12 to the nozzles 6. The machines 8 and 10 are driven by electric motors 13. The jet aerators 6, 7 have the following main dimensions:

liquid nozzle 15: 32 mm internal diameter
impulse exchange tube 7: 360 mm internal diameter and
2,650 mm in length.

The axis of the nozzles is parallel to partition 2 and bottom 14 of the ditch. The horizontal distance of the nozzle axis from partition 2 is 0.6 m and the distance of the nozzle axis from bottom 14 of the ditch is 0.25 m.

The column of bubbles 16 leaving the impulse exchange tube 7 imparts a vertical upward acceleration to the mixture of waste water and activated sludge. Since ejectors 6, 7 are disposed asymmetrically with reference to the axis of flow, the mixture passes up partition 2 and flows off to the side in the upper portion of the ditch, in particular at the surface 17. For reasons of continuity, the same mass flow must pass down the outer wall 2a and across the bottom 14 to the column of bubbles 16 within this given cross-section of current. In this way, a rotary motion is superimposed on the translational flow in the ditch and this effectively prevents settling of activated sludge.

Due to the sideward flow of the surface 17 of the mixture of waste water and activated sludge, the foam formed thereon and the foam circulating with the mixture is pressed together to form a thin stream, which is treated with sprinkling nozzles at only a few points 18.

EXAMPLE 2

Figure 4:
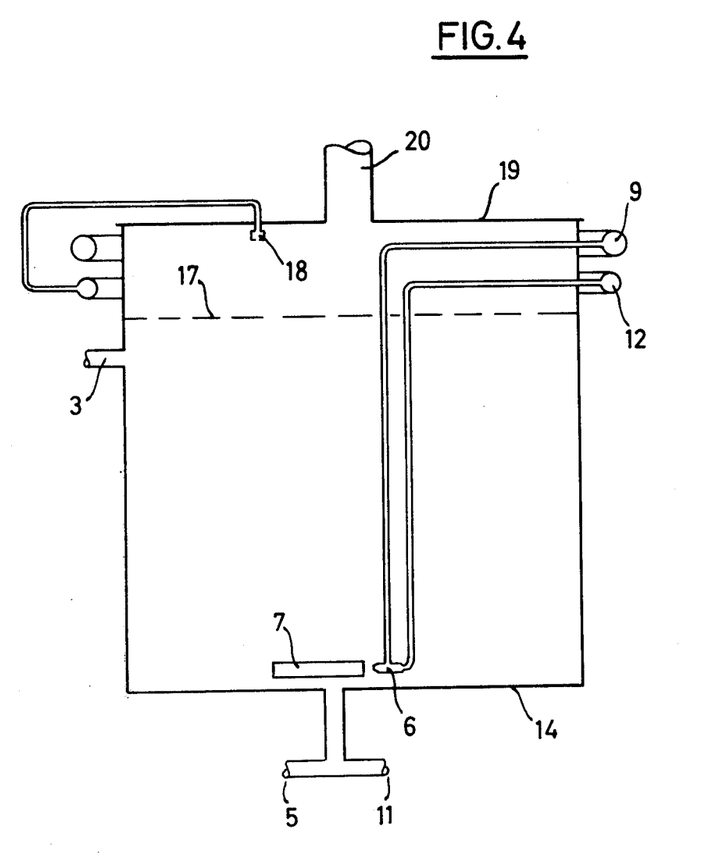

FIG. 4 shows the basin of an experimental treatment plant. The cylindrical basin having a vertical axis and a diameter of 2 m is filled with a mixture of waste water and activated sludge to a height of 1.8 m. At a distance of 0.2 m above the bottom 14 of the basin there are provided nozzles 6 and impulse exchange tubes 7 of two horizontal ejectors.

The main dimensions of the nozzles are as follows:
liquid nozzle 15: 5.2 mm internal diameter
impulse exchange tube 7: 50 mm internal diameter and 400 mm in length.

The orifices of the liquid nozzles 15 of the nozzles 6 are diametrically opposed to each other on a circle having its center in the vertical axis of the basin and having a diameter of 1.2 m. In the horizontal plane passing through the liquid nozzle orifice 15, ejectors 6, 7 are at an angle of 60° to the tangent to the edge of the basin and consequently the mass flows leaving ejectors 6, 7 are directed toward a smaller concentric circle. The mixture of waste water and activated sludge enters the basin through inlet 3 and leaves through outlet 5. A centrifugal pump sucks in mixture of waste water and activated sludge through tube 11 and conveys it through the annular pipe 12 to nozzles 6. This mixture is also passed to sprinkling nozzle 18 through annular pipe 12. Compressed air is passed to nozzles 6 through annular pipe 9. The basin is sealed by a cover 19 and the offgas passes out through a tube 20.

The plant described in this example has been operated continuously for the past 2 years. Measurements of the gas rates and the oxygen concentration in tubes 9 and 20 have shown that, when air is used for aeration, the oxygen absorption is as high as 50% or more when 1.0 mg of dissolved oxygen is present per liter of mixture of waste water and activated sludge. The rate of degradation of the BOD (biological oxygen demand over 5 days) is better than 90% at sludge rates of from 0.4 to 0.8 kg of BOD/kg of biochemically active dry substance per day. The space velocity is 1.3 to 2.3 kg of BOD/m³ of tank volume per day.

EXAMPLE 3

Figure 5:
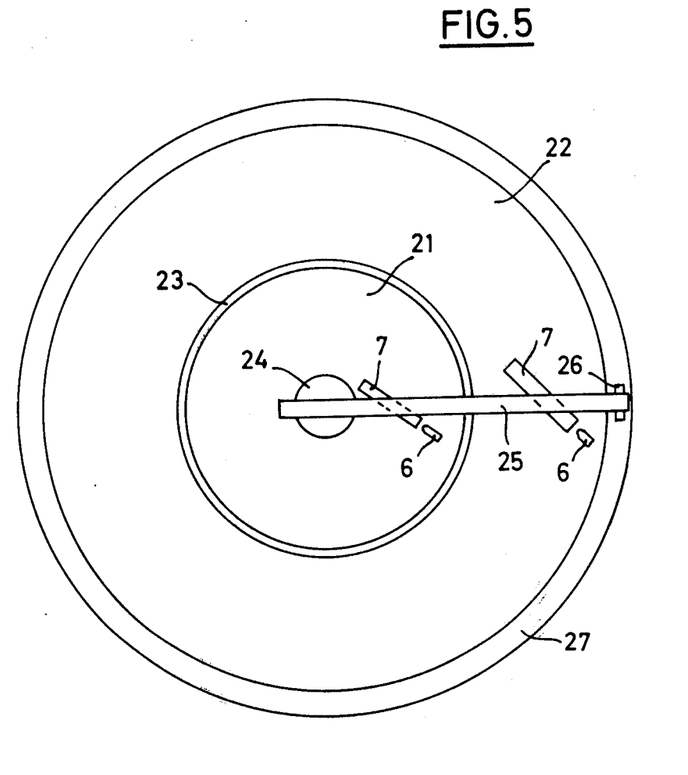

FIG. 5 shows a plan view of two tanks 21 and 22, tank 21 being concentric to tank 22. These tanks are separated by a vertical partition 23. Their volume may be the same or different. The central pillar 24 supports a rotatably mounted bridge 25 provided with a driving means 26 for rotation along the edge 27 of the basin in a clockwise direction. The driving means 26 are motor-driven. Two ejectors each consisting of a nozzle 6 and an impulse exchange tube 7 are attached to the bridge 25, one for each of the tanks. The flow of mass leaving the nozzles urges the contents of the tank to form an anti-clockwise current.

This type of plant is suitable with parallel operation of tanks 21 and 22 particularly for the treatment of waste waters containing a low percentage of pollutants, e.g. municipal sewage. Where the waste water or sewage contains a higher percentage of impurities, the tanks 21 and 22 may form a cascade. If desired, a number of stages may be added concentrically to those shown in FIG. 5. It is also possible to employ a plurality of bridges 25. The number of stages in the cascade and the number of nozzles and bridges depend on the concentration and type of pollutants in the sewage and on the properties of the activated sludge.

We claim:

1. A process for the treatment of waste water in activated-sludge systems by means of one or more aerating nozzles which comprises introducing from a nozzle or nozzles submerged in a body of waste water and activated sludge in a reservoir a gas stream of air or a high-oxygen gas or parallel, contiguous streams of air or a high oxygen gas and a propellant liquid into a small impulse exchange tube positioned contiguous to and axially downstream of said nozzle or nozzles, said nozzle or nozzles being positioned asymmetrically to the center of gravity of a transverse, cross sectional plane of said body of waste water and activated sludge and near the bottom of said body, producing a directional flow from the environment of the nozzle or nozzles in the reservoir by impulse exchange between the mass flow leaving the nozzle or nozzles at an average impulse density of from $10^3$ to $10^4$ N/m² and the mixture of waste water and activated sludge in said body flowing more slowly at an average impulse density of from 50 to $10^3$ N/m², and superimposing on said directional flow a rotary motion by the column of ascending bubbles emerging from the impulse exchange tube or tubes asymmetrically to said center of gravity and near the bottom of said body to provide a screw type flow of the mixture of waste water and activated sludge.

2. A process as claimed in claim 1, wherein the direction of the mass flow emerging from the nozzle or nozzles in the horizontal plane of projection is not more than ±90° to the lines parallel to the lateral walls of the reservoir or to the tangent to the curved walls of the reservoir and is inclined upwardly or downwardly by not more than 90° and contains a velocity component in the direction of the slower moving mixture of waste water and activated sludge in the vicinity of the nozzle or nozzles.

3. A process as claimed in claim 1, wherein the mixture of waste water and activated sludge is circulated in a closed loop in the reservoir.

4. A process as claimed in claim 1, wherein the gas stream is oxygen or a high-oxygen gas.

5. A process as claimed in claim 1, wherein the propellant liquid used for the nozzle or nozzles is raw waste water and/or clarified water and/or activated sludge and/or recycled sludge.

6. A process as claimed in claim 5, wherein antifoaming chemicals and/or antisettling agents and/or flocculating agents and/or adsorbents are added to the propellant liquid.

7. A process as claimed in claim 1, wherein the nozzle or nozzles are moved through the mixture of waste water and activated sludge.

8. A process as claimed in claim 7, wherein the flow of mass leaving the nozzle or nozzles has a velocity component which is counter to the direction of movement of the nozzle.

9. A process as claimed in claim 1 wherein said mass flow leaving said nozzles has an average impulse density in the range of 3000 to 5000 N/m$^2$ and said mixture has an average impulse density in the range of 90 to 500 N/m$^2$.

10. A process as claimed in claim 1 wherein the fluids are introduced from said nozzle or each of said nozzles as an annular gas stream of said air or high oxygen gas, surrounding and concentric with said stream of said propellant liquid.

11. A process as claimed in claim 1 wherein the fluids are introduced from said nozzle or each of said nozzles as an annular gas stream of said air or high oxygen gas surrounding and concentric with, as said propellant liquid, a liquid stream of at least one of raw waste water, clarified water, activated sludge and recycled sludge.

* * * * *